F. E. HARTER.
MICROMETER SCALE GAGE.
APPLICATION FILED JAN. 21, 1918.
1,311,602.
Patented July 29, 1919.
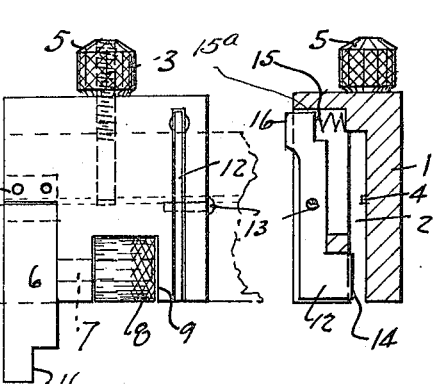
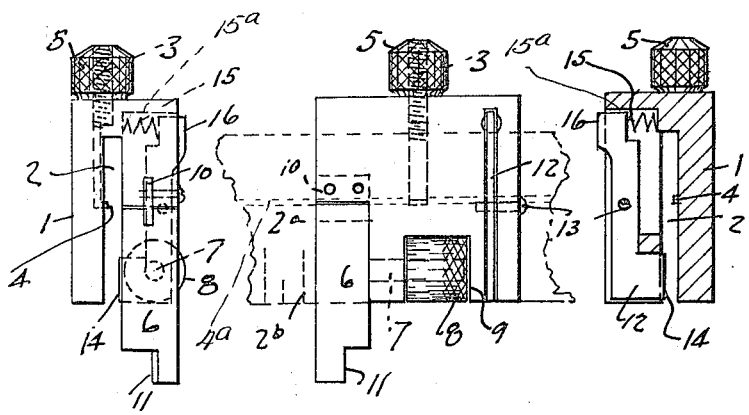
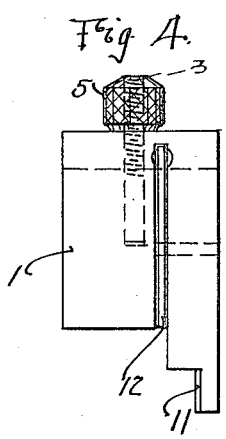
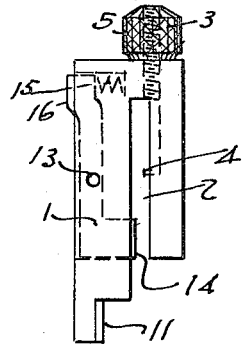
INVENTOR
Frank E. Harter
BY
Fred P. Lorin
ATTORNEY
THE COLUMBIA PLANOGRAPH CO., WASHINGTON, D. C.

UNITED STATES PATENT OFFICE.

FRANK E. HARTER, OF SEATTLE, WASHINGTON.

MICROMETER-SCALE GAGE.

1,311,602.  Specification of Letters Patent.  Patented July 29, 1919.

Application filed January 21, 1918. Serial No. 213,056.

*To all whom it may concern:*

Be it known that I, FRANK E. HARTER, a citizen of the United States, residing at Seattle, in the county of King and State of Washington, have invented certain new and useful Improvements in Micrometer-Scale Gages, of which the following is a specification.

This invention relates to improvements in micrometer scale gages and has for its principal object to provide an improved and novel scale gage which is adapted for use with a steel scale; to provide a micrometer scale gage which is removably attachable to the scale and which has means for positioning the gage with respect to the scale by co-operating with the graduation recesses in the scale. In machinist work and the like where steel scales are used, it is desirable to have a scale gage for setting calipers and for use as a depth gage. Applicant provides a cheap and simple device which is removably attachable to an ordinary steel scale. In order to secure the accurate positioning of the gage with respect to the scale, applicant provides a novel locking means which engages the graduation depressions on the scale, thereby accurately positioning the gage with respect to the scale.

Other objects will appear as my invention is more fully explained in the following specification, illustrated in the accompanying drawings and pointed out in the appended claims.

In the drawings, Figure 1 is an end elevation of the micrometer member of applicant's scale gage. Fig. 2 is a side elevation of same. Fig. 3 is a section taken about through the locking lever and looking in the opposite direction to Fig. 1. Fig. 4 is a side elevation of the other member of applicant's gage. Fig. 5 is an end elevation of same.

Referring more particularly to the drawings, numeral 1 indicates a block which has a longitudinal slot 2 cut throughout its length in order to receive the usual machinist's scale $2^a$ which is provided with notches or graduations $2^b$. A threaded clamp bolt 3 passes through the block along one side of the slot 2 and is provided with a dog 4 at one end which engages the usual slot $4^a$ in a machinist's scale. A thumb nut 5 on the upper end of bolt 3 permits of tightening the dog against the edge of the slot in the scale. The members 3, 4 and 5 are the same in the device shown in Figs. 1 to 3 inclusive as in Figs. 4 and 5 and are therefore given the same reference numeral. The block shown in Figs. 4 and 5 is provided with slot 2 the same as in Figs. 1 to 3. In Figs. 1 to 3, the block is notched in order to receive a slide 6 which is held in contact with the block by means of a threaded projection 7 which passes through a hole in the block and engages a graduated micrometer nut 8 which fits within a notch 9 in the lower face of the block. A guide strip 10 is secured in a kerf in the block and engages slidably a similar kerf in slide 6, thereby holding the slide in position. At the lower end, the slide is cut away and provided with a knife edge 11 against which the measurements are taken. Each of the blocks is provided with locking means for clamping the block along the scale and includes a lever 12 which is mounted on a pin 13 in a channel transversely of the block 1. The lower end of the lever 12 projects slightly within the slot 2 and is beveled on one side only to a rather sharp edge 14 so as to engage the depressions in the graduations on the scale. A small coil spring 15 sets in a recess $15^a$ in block 1 and reacts against the upper end of lever 12, thereby normally throwing the top of the lever outwardly. The upper end of the lever projects slightly beyond the face of the block as at 16 in order to provide a surface against which to press the finger in order to release the sharp edge of the lever from engagement with the scale. It will be understood that the device shown in Figs. 1 2 and 3 is used on one end of the machinist's scale while the member shown in Figs. 4 and 5 is at the opposite end of the scale and remains stationary while the adjustment is being made. Both of the members are slidably and removably mounted upon the scale.

While I have shown a particular form of embodiment of my invention, I am aware that many minor changes therein will readily suggest themselves to others skilled in the art without departing from the spirt and scope of the invention, and I therefore desire to avoid being limited to the exact form shown and described.

Having described my invention, what I claim as new and desire to protect by Letters Patent, is—

1. In a device of the character described, the combination of a slotted block formed with a transverse channel, a machinist's rule formed with graduation notches and fitting in said slot, a micrometer actuated slide mounted within the block and longitudinally movable with respect to the scale, and locking means mounted within said transverse channel in the block, whereby the block is positioned with respect to the scale by the engagement of the locking means with the graduation notches on the scale, said locking means including a lever pivoted in the block and having a beveled knife edge passing through the slot in the block and adapted to engage said graduation notches.

2. In combination, a block formed with a slot and a transverse notch, a machinist's rule provided with a notched scale and fitting in said slot, a slide mounted on said block and provided with a knife edge, a guide on the block for one end of the slide, a micrometer screw mounted on the block for adjusting the slide, and a locking lever mounted in the transverse notch at a right angle to the direction of movement of the slide and provided with a knife edge to engage the notches on the rule to position the block.

In testimony whereof I affix my signature.

FRANK E. HARTER.

Copies of this patent may be obtained for five cents each, by addressing the "Commissioner of Patents, Washington, D. C."